US008964867B2

(12) United States Patent
Andreozzi et al.

(10) Patent No.: US 8,964,867 B2
(45) Date of Patent: Feb. 24, 2015

(54) LTE SCHEDULING (75) Inventors: Matteo Maria Andreozzi, Pisa (IT); Marco Caretti, Turin (IT); Roberto Fantini, Turin (IT); Daniele Migliorini, Pisa (IT); Generoso Pagano, Paganico (IT); Dario Sabella, Turin (IT); Giovanni Stea, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 14/001,969

(22) PCT Filed: Mar. 3, 2011

(86) PCT No.: PCT/EP2011/053225
§ 371 (c)(1),
(2), (4) Date: Aug. 28, 2013

(87) PCT Pub. No.: WO2012/116755
PCT Pub. Date: Sep. 7, 2012

(65) Prior Publication Data
US 2013/0329826 A1    Dec. 12, 2013

(51) Int. Cl.
*H04L 27/28*  (2006.01)
*H04B 7/04*   (2006.01)
(Continued)

(52) U.S. Cl.
CPC .......... *H04B 7/0452* (2013.01); *H04L 5/0037* (2013.01); *H04L 5/0064* (2013.01); *H04L 25/03343* (2013.01); *H04L 27/0006* (2013.01); *H04B 7/0689* (2013.01)
USPC ........................................ 375/260; 455/452.2

(58) Field of Classification Search
None
See application file for complete search history.

(56) References Cited

U.S. PATENT DOCUMENTS

2010/0215108 A1   8/2010 Balachandran et al.
2011/0035639 A1*  2/2011 Earnshaw et al. ............. 714/748
(Continued)

FOREIGN PATENT DOCUMENTS

EP    2 273 716      1/2011
WO    2010 098981   9/2010

OTHER PUBLICATIONS

Schellmann, Malte et al., "A Fair Score-Based Scheduler for Spatial Transmission Mode Selection", Signals, Systems and Computers, Conference Record of the Forty-First Asilomar Conference on, IEEE, Piscataway, NJ, USA, pp. 1961-1966, XP031242418, (Nov. 4, 2007).

(Continued)

*Primary Examiner* — Kevin Kim
(74) *Attorney, Agent, or Firm* — Oblon, Spivak, McClelland, Maier & Neustadt, L.L.P.

(57) ABSTRACT

A method executed in a wireless communication network including at least one base station associated to a corresponding area transmitting/receiving data to/from corresponding user terminals located within the area. The method generates a user-rate matrix for each base station. Each element of the user-rate matrix provides a corresponding score, in terms of achievable rate, to a user terminal or group of user terminals within the corresponding area when a transmission is made to/from the user terminal or group of user terminals, respectively, from/to the base station by employing a selected transmission mode. The method further processes the elements of the user-rate matrix to create a scheduling list sorting the elements by a decreasing score, and associating to each user terminal a corresponding selected transmission mode based on the scheduling list for the transmission/reception of data to/from the base station.

16 Claims, 3 Drawing Sheets (51) Int. Cl.
*H04L 5/00* (2006.01)
*H04L 25/03* (2006.01)
*H04L 27/00* (2006.01)
*H04B 7/06* (2006.01)

(56) References Cited

U.S. PATENT DOCUMENTS

2012/0170530 A1* 7/2012 Zhang et al. .................. 370/329

2012/0269143 A1* 10/2012 Bertrand et al. .............. 370/329

OTHER PUBLICATIONS

Bonald, T., "A Score-Based Opportunistic Scheduler for Fading Radio Channels", Proc. of European Wireless Conference, Total (7 pages), XP002663083, (Feb. 2004).

International Search Report Issued Nov. 17, 2011 in PCT/EP11/53225 Filed Mar. 3, 2011.

* cited by examiner

LTE SCHEDULING

BACKGROUND OF THE INVENTION

1. Field of the Invention

The present invention generally relates to wireless communications networks, such as cellular networks. Specifically, the present invention relates to a scheduling process adapted to select a smart transmission mode to be used in a MU-MIMO-aware FDPS algorithm for LTE/LTE-A (or, more generally, for an Orthogonal Frequency-Division Multiple Access (OFDMA) system) downlink/uplink and perform QoS-aware scheduling decisions.

2. Overview of the Related Art

The evolution of wireless communication networks has experienced a significant growth in terms of diffusion and performance, and has recently brought to the standard 3GPP LTE and its evolution LTE-Advanced ("Third Generation Partnership Project Long Term Evolution Advanced"), which represent a major advance in cellular technology, as being designed to meet needs for high-speed data and media transport well into the next decades.

More particularly, the 3GPP LTE/LTE-Advanced is a highly efficient standard capable of conveying data information between a fixed-location transceiver radiating electromagnetic or radio waves over a respective land area called network cell, and typically referred to as enhanced base station or enhanced Node B ("eNodeB"), and user equipments ("UE"), e.g., user terminals, such as a cellular phones, within the network cell.

As known, the 3GPP LTE and its evolution LTE-Advanced employ advanced techniques, such as OFDMA and Multiple Input Multiple Output (MIMO) signal transmission.

The article "Downlink MIMO with Frequency-Domain Packet Scheduling for 3GPP LTE" by S.- B- Lee, S. Choudhury, A. Khoshnevis, S. Xu, and S. Lu, The 28th Conference on Computer Communications, April 2009, addresses the problem of frequency domain packet scheduling (FDPS) incorporating spatial division multiplexing (SDM) MIMO techniques on the 3GPP Long Term Evolution (LTE) downlink. This article provides for imposing the LTE MIMO constraint of selecting only one MIMO mode (spatial multiplexing or transmit diversity) per user per transmission time interval (TTI). First, the optimal MIMO mode selection (multiplexing or diversity) is addressed per user in each TTI in order to maximize the proportional fair (PF) criterion extended to frequency and spatial domains. It has been proved that the SU-MIMO (single-user MIMO) FDPS problem under the LTE requirement is NP-hard and therefore, it have been developed two approximation algorithms (one with full channel feedback and the other with partial channel feedback) with provable performance bounds. Based on 3GPP LTE system model simulations, the approximation algorithm with partial channel feedback is shown to have comparable performance to the one with full channel feedback, while significantly reducing the channel feedback overhead by nearly 50%.

The article "Evaluation for Various Resource Allocation Methods for Multiuser MIMO OFDMA Systems" by Jingon Joung and Yong H. Lee, IEEE 18th International Symposium on Personal, Indoor and Mobile Radio Communications, September 2007, discloses a simple algorithm to select user-pair and allocate frequency band for multiuser-MIMO OFDMA systems. For sake of comparison, various resource allocation algorithms, such as max-throughput, best-fit, first-fit, and random-fit algorithm, are examined with regard to the system throughput, computational complexity, and fairness among the users. Computer simulation results show that the first-fit algorithm can achieve a large reduction of computation for resource allocation as well as good fairness among users, with only a small reduction of throughput.

The article "A score-based Opportunistic Scheduler for Fading Radio Channels" by T. Bonald, Proc European Wireless, page 2, 2004 discusses different resource sharing strategies and presents some shortcomings of the classical Proportional Fair opportunistic scheduler.

SUMMARY OF INVENTION

In view of the foregoing, the Applicant has found that none of the presently known scheduling systems fulfill the following requirements:

- complying with an LTE standard configured to employ the transmission modes known as Spatial Multiplexing, Transmit Diversity and Multi-User MIMO (MU-MIMO);
- being in a cellular network with a single base station and a plurality of active users, with a system bandwidth that is divided in a plurality of resource blocks, operating in such a way that on each transmission time interval, the base station can allocate several resource blocks to the same user (or to the same pair, for MU-MIMO allocations), but a single RB can be allocated to only one user (or only one pair);
- having a user in a transmission time interval to use only one transmission mode in all the resource blocks assigned to it.—for MU-MIMO allocations, if two users are paired during a transmission time interval, pairing said users on each resource block assigned through the scheduling (this implies that a MU-MIMO pair uses exactly the same time-frequency resources in a transmission time interval), and
- having the base station to use the same modulation and coding scheme on all the resource blocks that it allocates to a given user, even if the channel quality indicators specified for those resource blocks are different. One or more aspects of the solution according to an embodiment of the invention are set out in the independent claims, with advantageous features of the same solution that are set forth in the dependent claims (whose wording is enclosed herein verbatim by reference).

More particularly, the solution according to one or more embodiments of the present invention relates to a method to be carried out in a wireless communication network comprising at least one base station associated to a corresponding area for transmitting/receiving data to/from corresponding user terminals located within said area. The method comprises generating a user-rate matrix for each base station. Each element of the user-rate matrix provides a corresponding score, in terms of achievable rate, to a user terminal or to a group of user terminals located within the corresponding area when a transmission is made to/from said user terminal or said group of user terminals, respectively, from/to the base station by employing a selected transmission mode among a set of predetermined transmission modes. The method further comprises processing the elements of the user-rate matrix in order to create a scheduling list where the elements are sorted by a decreasing score, and associating to each user terminal a corresponding selected transmission mode based on the scheduling list for the transmission/reception of data to/from the base station. Said set of predetermined transmission modes includes at least a spatial multiplexing transmission mode, a transmit diversity transmission mode and a multi-user multiple-input multiple-output transmission mode.

Advantageously, being the bandwidth of each area partitioned in a corresponding plurality of resource blocks, said generating a user-rate matrix comprises generating a plurality of corresponding sub-matrixes, with each sub-matrix that corresponds to a specific resource block. Each element of a sub-matrix provides a corresponding score to a user terminal or to a group of user terminals located within the corresponding area when a transmission is made to/from said user terminal or said group of user terminals, respectively, from/to the base station by employing a selected transmission mode among the set of predetermined transmission modes using the corresponding resource block. Said group of user terminals comprises a pair of user terminals.

According to an embodiment of the present invention, said generating a plurality of sub-matrixes includes generating each sub-matrix by arranging the elements thereof into a first number of rows corresponding to the number of user terminals within the corresponding area and a second number of columns corresponding to one plus the first number. Each row of the sub-matrix corresponds to a respective user terminal and each column of the sub-matrix, with the exception of the last column, corresponds to a respective user terminal. Each sub-matrix is such that:
  each element thereof belonging to the main diagonal represents the score of the user terminal corresponding to the row of the element when a transmission is made to/from said user terminal from/to the base station by employing the spatial multiplexing transmission mode using the corresponding resource block;
  each element thereof that do not belong neither to the main diagonal nor to the last column represents the score of the pair of user terminals including the one corresponding to the row of the element and the one corresponding to the column of the element when a transmission is made to/from said pair of user terminals from/to the base station by employing the multi-user multiple-input multiple-output transmission mode using the corresponding resource block, and
  each element thereof belonging to the last column represents the score of the user terminal corresponding to the row of the element when a transmission is made to/from said user terminal from/to the base station by employing the transmission diversity transmission mode using the corresponding resource block.

According to an embodiment of the present invention, said processing the elements of the user-rate matrix in order to create the scheduling list comprises generating a further matrix based on the user-rate matrix. Said further matrix has a number of rows equal to the first number and a number of columns equal to the second number. Each row of the further matrix is associated with a corresponding row of each sub-matrix, and each column of the further matrix is associated with a corresponding column of each sub-matrix. Each element of the further matrix belonging to a row and a column of the further matrix depends on the values of the elements of the sub-matrixes belonging to the corresponding rows and the corresponding columns of the sub-matrixes associated with said row and column of the further matrix. Said processing the elements of the user-rate matrix in order to create the scheduling list further comprises repeating the steps of:
  finding the highest element of such further matrix;
  inserting in the scheduling list the elements of the sub-matrixes located in the rows and columns associated with the row and column of the highest element of the further matrix, said inserting being performed according to a score decreasing order, and
  zeroing the elements of the further matrix belonging to the row and column of the highest element and, if the highest element is located in a row of the further matrix identified by a first row matrix index and in a column of the further matrix identified by a first column matrix index with the first row matrix index that is different from the first column matrix index and the first column matrix index that is different from the second number, zeroing also the elements of the further matrix belonging to the row identified by a second row matrix index equal to the first column matrix index and to the column identified by a second column matrix index equal to the first row matrix index,
until each one of the user terminals located within the area has an element of each sub-matrix located in a row or column corresponding thereto that is listed in the scheduling list.

According to an embodiment of the present invention, said generating the further matrix based on the user-rate matrix comprises setting each element of the further matrix belonging to a row and a column of the further matrix to a value depending on the sum of a group of values. Each value of the group corresponds to the quotient of the division between an element of a respective sub-matrix belonging to the corresponding row and the corresponding column of such sub-matrix which are associated with said row and column of the further matrix, and a power of two.

According to a further embodiment of the present invention, said generating the further matrix based on the user-rate matrix comprises setting each element of the further matrix belonging to a row and a column of the further matrix to a value depending on a set of the highest elements of the sub-matrixes belonging to the corresponding rows and the corresponding columns of the sub-matrixes associated with said row and column of the further matrix.

According to a still further embodiment of the present invention, said processing the elements of the user-rate matrix in order to create the scheduling list comprises repeating the steps of:
  finding the highest element of the user-rate matrix, said highest element belonging to a particular row and a particular column of a particular sub-matrix of the plurality;
  inserting in the scheduling list the elements of the sub-matrixes of the plurality which are located in the row and column corresponding to the user terminal or the user terminals corresponding to said particular row and said particular column, said inserting being performed according to a score decreasing order, and
  in each sub-matrix, zeroing the elements belonging to the row and column corresponding to the user terminal or the user terminals corresponding to said particular row and said particular column and, if the particular row is identified by a first row matrix index and the particular column is identified by a first column matrix index with the first row matrix index that is different from the first column matrix index and the first column matrix index that is different from the second number, zeroing also the elements belonging to the row corresponding to the user terminal corresponding to the row of the particular sub-matrix identified by a second row matrix index equal to the first column matrix index and to the column corresponding to the user terminal corresponding to the column of the particular sub-matrix identified by a second column matrix index equal to the first row matrix index,
until each one of the user terminals located within the area has an element of each sub-matrix located in a row or column corresponding thereto that is listed in the scheduling list.

Preferably, said associating to each user terminal a corresponding selected transmission mode based on the scheduling list includes associating the same selected transmission mode onto all the resource blocks wherein said user terminal is allocated.

Preferably, the method further includes, for each sub-matrix, scaling the value of each element with a weight indicative of the amount of inter-cell interference on the resource block corresponding to such sub-matrix.

According to an embodiment of the present invention, the method further includes:

based on the scheduling list, generating an allocation list providing, for each user terminal, or pair of user terminals, a corresponding group of resource blocks to be assigned thereto, and based on the allocation list, assigning each resource block to a specific user terminal, or to a pair of user terminals, for the transmission/reception of data to/from the base station taking into account quality of service requirements.

According to a further embodiment of the present invention, said generating the allocation list includes:

having a group of classes of services, defining for each class of service of the group a corresponding urgent queue of user terminals having urgent data, for each user terminal in an urgent queue, updating the corresponding group of resource blocks to be assigned thereto with new free resource blocks until at least one of the following conditions is fulfilled:

the urgent data of such user terminal, or pair of user terminals, are finished;

a predetermined maximum amount of allocable data is reached, and there are no more free resource blocks.

According to an embodiment of the present invention, said generating the allocation list further includes, for each user terminal, updating the corresponding group of resource blocks to be assigned thereto with a new free resource block wherein such user terminal, or pair of user terminals, has a local peak in its channel quality.

According to a further embodiment of the present invention, said generating the allocation list further includes, for each user terminal, or pair of user terminals, updating the corresponding group of resource blocks to be assigned thereto with a new free resource block according to a MaxCi-like behavior.

According to a still further embodiment of the present invention, said assigning each resource block to a specific user terminal, or to a pair of user terminals, for the transmission/reception of data to/from the base station further includes adaptively selecting a modulation and coding scheme to be used onto a resource block in such a way that all the resource blocks belonging to a same codeword use the same modulation and coding scheme, by verifying whether it is profitable for the cell throughput to allocate a new resource block to a user terminal, or pair of user terminals, that has already been allocated at least one resource block.

Another aspect of the solution according to an embodiment of the present invention relates to a wireless communication network comprising at least one base station associated to a corresponding area for transmitting/receiving data to/from corresponding user terminals located within said area.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

DETAILED DESCRIPTION OF PREFERRED EMBODIMENTS OF THE INVENTION

Figure 1:
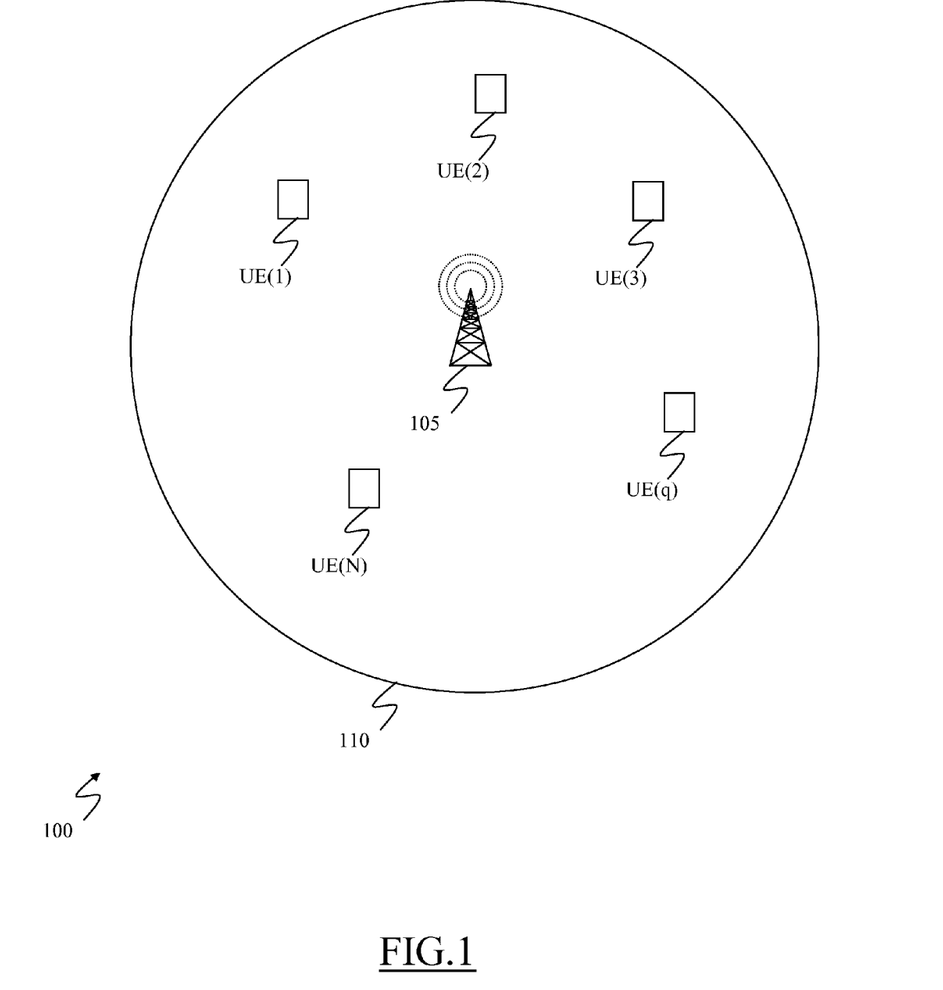
FIG. 1 schematically shows a wireless communications network wherein the solution according to one or more embodiments of the present invention may be applied.

With reference to the figures, a wireless communications network 100 wherein the solution according to one or more embodiments of the present invention may be applied includes, as schematically shown in FIG. 1, one or more base stations (only one illustrated), referred to as eNodeB (enhanced Node B), and identified with the reference 105. Each eNodeB 105 provides for radio coverage over a corresponding geographic area 110—referred to as network cell—for allowing user terminals (e.g., mobile phones) within the network cell 110 to receive a required service. In the exemplary scenario shown in FIG. 1, the eNodeB 105 provides radio coverage to a plurality of N user terminals UE(q) (q ranging from 1 to N).

In the exemplary but not limiting embodiment described, the wireless communication network 100 is compliant with the Long Term Evolution (LTE) of the Third Generation Partnership Project (3GPP) Universal Mobile Telecommunications System (UMTS) protocol, wherein the eNodeB 105 transmits using e.g. an orthogonal frequency division multiple access (OFDMA) scheme for the downlink transmissions, i.e., from the eNodeB 105 to the user terminals UE(q) within the network cell 110 pertaining to the eNodeB 105.

For the sake of completeness, as well known by those having ordinary skill in the art, the eNodeBs, such as the eNodeB 105, are generally part of a radio access network (not depicted), which typically includes one or more radio network controllers (not shown) communicably coupled to further respective eNodeBs; in turn, the radio access network is generally communicably coupled to one or more core networks (not shown), which may be coupled to other networks, such as the Internet and public switched telephone networks (not illustrated).

According to an embodiment of the present invention, the eNodeB 105 is configured to implement a scheduling process adapted to select the smart transmission mode to be used (by the eNodeB 105 itself) for transmitting data to the user terminals UE(q) within the network cell 110. Additionally, in order to maximize the transmission performance, according to an embodiment of the present invention the scheduling process is further configured to efficiently allocate the user terminals UE(q) in the system bandwidth by adaptively selecting the best Modulation and Coding Scheme (MCS), taking into account the Quality of Service (QoS) requirements.

Figure 2:
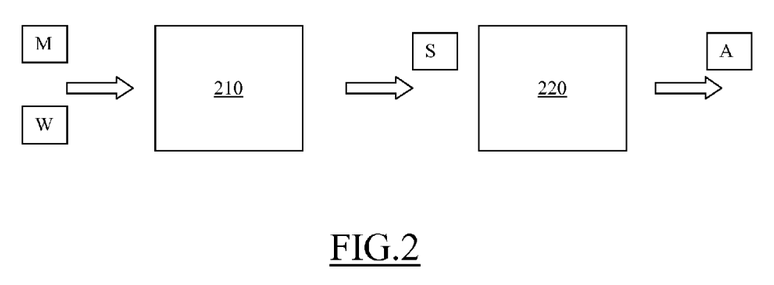
FIG. 2 is a schematic diagram illustrating the main components of a scheduling process adapted to be carried out by an eNodeB of the communication network of FIG. 1 according to an embodiment of the present invention.

FIG. 2 is a schematic diagram illustrating in terms of functional blocks the main components of the scheduling process adapted to be carried out by the eNodeB 105 according to an embodiment of the present invention.

It is considered to have a group of three possible transmission modes, i.e., the Spatial Multiplexing (SpMux) transmission mode, the Transmit Diversity (TxD) transmission mode, and the Multi user MIMO (MU-MIMO) transmission mode, and that the system bandwidth is subdivided into a plurality of B resource blocks RB(b) (b ranging from 1 to B). Moreover, it is considered to have a user-rate three-dimensional matrix M providing a corresponding score—reflecting the achievable rate, defined in the following—to each user terminal UE(q) (and to each possible pair of user terminals UE(q)) when they are scheduled by the eNodeB according to the various transmission modes of the group onto each resource block RB(b) of the system bandwidth. Furthermore, it is considered to have a weight array W, which provides, for each resource block RB(b), a corresponding weight indicative of the amount of inter-cell interference on the resource block RB(b) itself.

According to an embodiment of the present invention, the scheduling process comprises a first procedure 210, referred to as Transmission Mode Selection (TMS) procedure, which, during each Transmission Time Interval (TTI, where each TTI lasts 1 ms), selects for each user terminal UE(q) the best transmission mode among those of the group based on the received user rate matrix M and the weight array W. As will be described in detail in the following of the present description, the TMS procedure 210 outputs a schedule list S specifying for each user terminal UE(q)—or, in case of MU-MIMO transmission mode, for each pair of user terminals UE(q)—the selected transmission mode and the corresponding score for each resource block RB(b).

According to an embodiment of the present invention, the scheduling process additionally comprises a second procedure 220, referred to as QoS-aware Scheduling (QS) procedure, which, during each TTI, assigns each resource block RB(b) to a specific user terminal UE(q) (or, in case of MU-MIMO transmission mode, a pair of user terminals UE(q)) taking into account the QoS requirements. As will be described in detail in the following of the present description, based on the schedule list S generated by the TMS procedure 210, the QS procedure 220 outputs an allocation list A specifying for each user terminal UE(q) (or pair of user terminals in case of MU-MIMO transmission mode) the resource block RB(b) that has been assigned thereto, as well as the amount of bytes that have been transmitted. The assignment of the resource blocks RB(b) indicated by the allocation list A provides support to QoS policies, since each traffic is taken into consideration based on its specific requirements.

Figure 3:
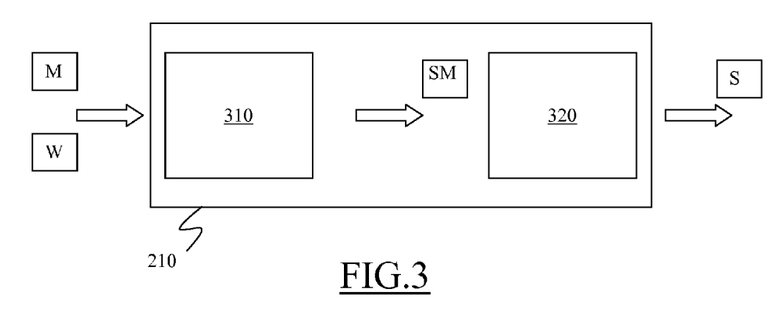
FIG. 3 is a schematic diagram illustrating the main components of a Transmission Mode Selection (TMS) procedure of the scheduling process of FIG. 2 according to an embodiment of the present invention.

FIG. 3 is a schematic diagram illustrating in terms of functional blocks the main components of the TMS procedure 210 according to an embodiment of the present invention. The TMS procedure 210 comprises two sub-procedures, namely a scaling sub-procedure 310 adapted to weigh the elements of the rate matrix M based on the weight array W for generating a corresponding scaled rate matrix SM, and a selection sub-procedure 320 adapted to generate the schedule list S from the scaled rate matrix SM.

The three-dimensional rate matrix M and its scaled version, SM, have a dimension B*N*(N+1), wherein B is the number of resource blocks RB(b) of the system bandwidth and N is the number of user terminals UE(q) within the network cell covered by the eNodeB that carries out the scheduling process. The rate matrix M can be subdivided into B two-dimensional matrixes, each one having N rows and N+1 columns. For the sake of conciseness, from now on N+1 will be indicated as G.

The generic element $m_{bij}$ (b ranging from 1 to B, i ranging from 1 to N, j ranging from 1 to G) of the rate matrix M represents the score—in terms of achievable rate—of a corresponding set SUE of user terminals UE(q) identified by the index pair {i,j} when employing a specific transmission mode on the resource block RB(b) according to the following selection rule:

$i=j \rightarrow$ SUE=user terminal UE(q=i) in SpMux transmission mode;

$i \neq j$, $j \neq G \rightarrow$ SUE=user terminal UE(q=i) and user terminal UE(q=j) paired in MU-MIMO transmission mode, and $j=G \rightarrow$ SUE=user terminal UE(q=i) in TxD transmission mode.

The weight array W is an array of B weights $w_b$ (b=1 to B) each one with values comprised between 0.0 and 1.0 and providing an indication of the intercell interference occurring in the resource block RB(b). When the interference is so high that the resource block RB(b) cannot be used, the corresponding weight $w_b$ has a value equal to 0.0. The lower the interference, the higher the value of the weight $w_b$. When the interference is null, the corresponding weight $w_b$ has a value equal to 1.0. The methods by which the weight array W is obtained are outside the scope of this document. For merely exemplary purposes, we mention that it can be obtained through suitable communication between coordinating eNodeBs in a network or cluster.

According to an embodiment of the present invention, the scaling sub-procedure 310 provides for weighing the elements of the rate matrix M with the weight array W so as to obtain a scaled version thereof (the scaled matrix SM) to be provided to the selection sub-procedure 320 for generating the schedule list S. The generic element $sm_{bij}$ of the scaled matrix SM is equal to $m_{bij}*w_b$. This way, the scores provided by the rate matrix M are adjusted taking into account the intercell interferences of the resource blocks RB(b), so that the selection sub-procedure 320 will privilege the elements corresponding to higher weight $w_b$ values, all else being equal.

According to an embodiment of the present invention, based on the scores provided by the scaled matrix SM, the selection sub-procedure 320 provides for selecting the best transmission mode for each user terminal UE(q) taking into account the following constraints:

a user terminal UE(q) must use the same transmission mode onto all the resource blocks RB(b) wherein such user terminal UE(q) is allocated, and if two user terminal UE(q) are paired according to a MU-MIMO transmission mode, said pairing must be maintained onto each resource block RB(b) wherein such user terminals UE(q) are allocated.

The schedule list S generated by the selection sub-procedure 320 includes a plurality of tuples T{b, i, j, $sm_{bij}$}, wherein:

b is the index of a resource block RB(b);

i and j identify a set SUE of user terminal(s) UE(q) transmitted with the specific transmission mode selected according to the abovementioned selection rule, and $sm_{bij}$ is the score of such set SUE of user terminals UE(q) (scaled according to the intercell interferences in the corresponding resource block RB(b)).

The tuples T {b, i, j, $m_{bij}$} are globally sorted according to the score $sm_{bij}$ in decreasing order, so as to allow one to assess which transmission modes are better suited for scheduling the various user terminals UE(q) onto each resource block RB(b) (i.e., the ones corresponding to the highest scores).

Different methods for generating the schedule list S from the scaled matrix SM will be now described according to various embodiments of the present invention.

According to a method herein referred to as "sum method", a two-dimensional matrix X having a dimension N*G is generated starting from the scaled matrix SM. Each element $x_{ij}$ of the matrix X is given by the sum of the B elements $sm_{bij}$ (b=1 to B) of the scaled matrix SM. An iterative search is then performed on the matrix X.

Specifically, during a first step of the search, the element $\underline{x}_{ij}$ of the matrix X having the highest value is identified. A first group of B tuples of the schedule list S is then generated by using the index pair {i, j} of such element $\underline{x}_{ij}$ for each resource block RB(b), i.e. the tuples T{b, i, j, $sm_{bij}$}, with b=1 to B. At this point, the elements of the matrix X corresponding to the set SUE of user terminals UE(q) identified by the index pair {i, j} of the previously calculated highest element $\underline{x}_{ij}$ are set to zero, in such a way to exclude them from the search performed in the following step. Specifically:

in case the index pair {i, j} of the previously calculated highest element $\underline{x}_{ij}$ has i=j, meaning that the user terminal UE(i) has been selected to be transmitted by using the SpMux transmission mode, or if j=G, meaning that the user terminal UE(i) has been selected to be transmitted by using the TxD transmission mode, the i-th row and the i-th column of the matrix X are set to zero;

if the index pair {i, j} of the previously calculated highest element $\underline{x}_{ij}$ has i≠j and j≠G, meaning that the pair formed by the user terminals UE(i) and UE(j) has been selected to be transmitted by using the MU-MIMO transmission mode, the i-th row, the i-th column, the j-th row and the j-th column of the matrix X are set to zero.

In other words all the elements of the matrix X related to the row(s) and column(s) of the user terminals for which the transmission mode has been selected are set to zero.

The abovementioned operations are then reiterated at each subsequent step, with the matrix X that is accordingly updated according to the highest elements calculated in all the preceding steps, until all the matrix elements are null.

A further method, herein referred to as "shift and sum method", provides for performing the same operations of the sum method, except the ones aimed at generating the matrix X. More in particular, instead of directly summing the elements $sm_{bij}$ of the scaled matrix SM with the change in b (from 1 to B), this method provides for summing these same elements after having right-shifted their binary representation by K positions, wherein K is a configurable non negative value. This operations corresponds to considering the quotient of the integer division by 2^K of each element.

Another variation of the sum method, herein referred to as "sum k-max method" provides for generating each element $x_{ij}$ of the matrix X by summing only the highest k elements $sm_{bij}$ of the scaled matrix SM (i.e., the highest elements found allowing b to range from 1 to B, for a same pair of subscripts i,j), instead of using all the elements $sm_{bij}$ obtained by spanning b from 1 to B, where k is a configurable positive value.

A still further method, herein referred to as "max local method", provides for generating a matrix L having a dimension N*G wherein each element $l_{ij}$ is the highest element (i.e., the highest elements found allowing b to range from 1 to B, for a same pair of subscripts i,j) of the elements $sm_{bij}$ of the scaled matrix SM. The rest of the operations are equal to those performed by the sum method.

According to a method herein referred to as "max method", an iterative search is directly performed on the scaled matrix SM for finding the highest element $\underline{sm}_{bij}$ thereof. During each step, the index pair {i, j} corresponding to the element $\underline{sm}_{bij}$ of the scaled matrix SM having the highest value is used for generating a corresponding group of B tuples of the schedule list S for each resource block RB(b), i.e. the tuples T{b, i, j, $sm_{bij}$}, with b=1 to B. Like in the sum method, after generating each group of tuples, the elements of the scaled matrix SM corresponding to the set SUE of user terminals UE(q) identified by the index pair {i, j} of the previously calculated highest element $\underline{sm}_{bij}$ are set to zero, so as to exclude them from the search performed in the following steps. The abovementioned operations are then reiterated at each subsequent step, until all the matrix elements are null.

A further method, herein referred to as "spatial-multiplexing max method", provides for an iterative search of the highest element by considering only the elements $sm_{bij}$ of the scaled matrix SM that are located on the diagonals of the corresponding B two-dimensional matrixes N*G forming the scaled matrix SM, i.e. those with i=j. Having identified such highest element $\underline{sm}_{bij}$ in the b-th two-dimensional matrix SM(b), a further highest element $\underline{sm}_{bhk}$ is searched among the elements $sm_{bij}$ of the b-th two-dimensional matrix located in the i-th row and in the j-th column. During each step, the index pair {h, k} corresponding to the element $\underline{sm}_{bhk}$ is used for generating a corresponding group of B tuples of the schedule list S for each resource block RB(b), i.e. the tuples T {b, h, k $m_{bhk}$}, with b ranging from 1 to B. In this case as well, after generating each group of tuples, the elements of the scaled matrix SM corresponding to the set SUE of user terminals UE(q) identified by the index pair {h, k} of the previously calculated highest element $\underline{sm}_{bhk}$ are set to zero, so as to exclude them from the search performed in the following steps. The abovementioned operations are then reiterated at each subsequent step, until all the possible user terminals UE(q) have been considered.

Summarizing, the TMS procedure 210 of the scheduling process according to an embodiment of the present invention outputs a schedule list S comprising an ordered sequence of tuples T{b, i, j, $sm_{bij}$}. Each tuple provides a score $sm_{bij}$ to a particular set SUE of user terminals UE(q) transmitted on a particular resource block RB(b) using a particular transmission mode.

If the generic tuple T{b, i, j, $sm_{bij}$} of the schedule list S has i=j, it means that the corresponding score $sm_{bij}$ is referred to a single user terminal UE(q=i) transmitted with the SpMux transmission mode on the resource block RB(b).

If the generic tuple T{b, i, j, $sm_{bij}$} of the schedule list S has i≠j and j≠G, it means that the corresponding score $sm_{bij}$ is referred to a pair of user terminals UE(q=i), UE(q=j) transmitted with the MU-MIMO transmission mode on the resource block RB(b).

If the generic tuple T{b, i, j, $sm_{bij}$} of the schedule list S has j=G, it means that the corresponding score $sm_{bij}$ is referred to a single user terminal UE(q=i) transmitted with the TxD transmission mode on the resource block RB(b).

According to an embodiment of the present invention, the choice of which transmission modes are used by the eNodeB towards each user terminal UE(q) is carried out by selecting the {transmission mode-user terminals} pairs provided by the tuples T{b, i, j, $sm_{bij}$} of the schedule list S having the highest scores $sm_{bij}$.

Recalling FIG. 2, the scheduling process may additionally comprises the QS procedure 220, which is a procedure configured to assign, during each TTI, each resource block RB(b) to a specific user terminal UE(q) (or, in case of MU-MIMO transmission mode, a pair of user terminals UE(q)) taking into account the QoS requirements.

As already mentioned, based on the schedule list S generated by the TMS procedure 210, the QS procedure 220 outputs an allocation list A specifying for each user terminal UE(q) (or pair of user terminals in case of MU-MIMO transmission mode) the resource block RB(b) that has been assigned thereto, as well as the amount of bytes that have been transmitted. In other words, the QS procedure 220 uses the information provided by the schedule list S to make scheduling decisions that both fulfill QoS requirements and use radio resources effectively. In particular, when the QS procedure chooses to perform an allocation for a set SUE of user terminals UE(q), it uses the schedule list S in order know which resource block RB(b) provides the highest achievable rate, among the not yet allocated resource blocks RB(b). According to an embodiment of the present invention the allocation will be performed on that resource block RB(b) using an MCS-adaptive allocation function that will be described in the following of the present invention.

As will be described in the following, the QS procedure 220 allows several goals to be achieved. First of all, it manages real-time traffics (like voice and video), and it is able to favor that the time constraints typical of such traffics are met (i.e., deadline misses should be prevented). Furthermore, the QS procedure 220 is "fair", in the sense that different user terminals UE(q) belonging to a same class of service are treated with equity, and starvation does not occur. Finally, the QS procedure 220 uses radio resources effectively, exploiting multi user diversity in both frequency and spatial domains.

Figure 4:
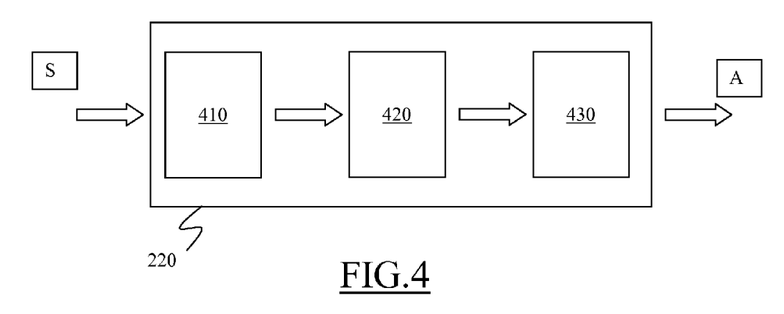
FIG. 4 is a schematic diagram illustrating the main components of a QoS-aware Scheduling (QS) procedure of the scheduling process of FIG. 2 according to an embodiment of the present invention.

To achieve these different objectives, according to an embodiment of the invention illustrated in FIG. 4 the QS procedure 220 comprises three sub-procedures: a so-called urgency sub-procedure 410, a so-called fairness sub-procedure 420, and a so-called efficiency procedure 430.

Each of said three sub-procedures aims at achieving a different objective. Specifically, the urgency sub-procedure 410 deals with time constraints of real-time traffic, the fairness sub-procedure 420 ensures a minimal service to each user terminal UE(q) taking into account the effective use of resources, and the efficiency sub-procedure 430 aims at maximizing cell throughput on the residual resources.

The urgency sub-procedure 410 has the task to avoid deadline misses for real-time traffic, in order to allow data to be received within a maximum radio delay budget. The urgency sub-procedure uses the concept of Urgent Queue (UQ). Briefly, an UQ is a First-In-First-Out (FIFO) queue of terminals UE(q) having urgent data. There may be several UQs, e.g. one for each class of service having real-time requirements. When a user terminal UE(q) has data whose delay is close to the radio delay budget defined for the corresponding class of service, this user terminal UE(q) is considered to be in urgency and it is put in the UQ corresponding to the above mentioned class of service. The urgency sub-procedure 410 represents the first step of the QS procedure 220, since in this way the user terminals UE(q) requiring urgent real-time data are served with strict priority over all other user terminals UE(q). It should be noticed that if a user terminal UE(q) is not considered to be in urgency, this dosen't mean that the packet isn't transmitted (as described in the following).

For each UQ, the following parameters are defined:
Priority: it represents the service priority of a UQ related to the other UQs;
Radio delay budget: defined as the upper bound of the delay between the eNodeB and the UE(q) (e.g., derived from the PDB, Packet Delay Budget, defined by the 3GPP standard);
Max urgent burst: it specifies the maximum amount of bytes that can be served by the sub-procedure 410 for a user terminal UE(q), and
Slack time: it specifies how much time before the deadline a data packet has to be considered urgent.

As a mere title of example, by giving appropriate values to said parameters, it is possible to map the QoS Class Identifiers (QCI) provided by LTE onto the UQs. By configuring the Priority parameter, it is possible to differentiate both the classes of service (service differentiation) and different users or classes thereof (user differentiation), e.g. by defining additional proprietary QCIs.

The urgency sub-procedure 410 serves the UQs in descending order of priority. During the service, the sub-procedure 410 allocates resource blocks RB(b) to a user terminal UE(q) until:
the urgent data of such user terminal UE(q) are finished;
Max urgent burst is reached, or
there are no more resources in the current TTI.

According to an embodiment of the present invention, the allocations of the resource blocks RB(b) carried out by the urgency sub-procedure 410 are performed using a novel MCS-adaptive allocation function that will be described in the following of the description.

The fairness sub-procedure 420 provides for keeping trace of the highest channel quality (among those specified for all the resource blocks RB(b)) of each user terminal UE(q) over a time window of T TTIs. When a user terminal UE(q) has a local peak in its channel quality, that user terminal UE(q) is served on the resource block RB(b) where the peak is reached. The fairness sub-procedure 420 provides for serving a user terminal UE(q) when its relative channel conditions are good with respect to its history. Even if a user terminal UE(q) never exhibits absolutely good channel conditions (this is the case, for instance, of user terminals UE(q), the fairness sub-procedure 420 guarantees a minimal service to this user terminal UE(q) too, choosing the best time to serve it.

For each class of service, the following parameters are defined:
the size T of the time window (i.e., the number of TTIs forming the time window), and
the threshold t beyond which the actual channel quality is considered to be part of a peak.

Defining with "achievable rate" the rate obtainable by a user terminal UE(q) onto a resource block RB(b)—given its channel quality—if such resource block RB(b) was used for scheduling data of said user terminal UE(q), the fairness sub-procedure 420 assesses that a user terminal UE(q) has a local peak in its channel quality if its actual best achievable rate(s) (corresponding to one or more resource block(s) RB(b) that have not been allocated yet) is higher than at least t historical achievable rates (among the T achievable rates in the window). Particularly, by indicating with $r_i$ the achievable rate in the i-th position of the time window, and by indicating with $r_c$ the actual achievable rate on a given resource block RB(b), the fairness sub-procedure 420 assesses that a user terminal UE(q) has a local peak on that resource block RB(b) if $$\sum_{i=1}^{T} 1_{\{r_c > r_i\}} \geq t.$$

According to an embodiment of the present invention, like the urgency sub-procedure 410, also the allocations of the resource blocks RB(b) carried out by the fairness sub-procedure 420 are performed using the MCS-adaptive allocation function that will be described in the following of the description.

The last sub-procedure of the QS procedure 220 is the efficiency sub-procedure 430. Such sub-procedure provides for allocating the remaining resource blocks RB(b) according to a MaxCi-like behavior, so as to exploit those frequency resources that have been left unused so far for maximizing the throughput.

According to an embodiment of the present invention, also the allocations of the resource blocks RB(b) carried out by the efficiency sub-procedure 420 are performed using the MCS-adaptive allocation function used by the urgency sub-procedure 410 and by the fairness sub-procedure 420.

According to an embodiment of the present invention, the MCS-adaptive allocation function is configured to adaptively select the MCS to be used onto a resource block RB(b) in such a way that all the resource blocks RB(b) belonging to a same codeword use the same MCS.

Figure 5:
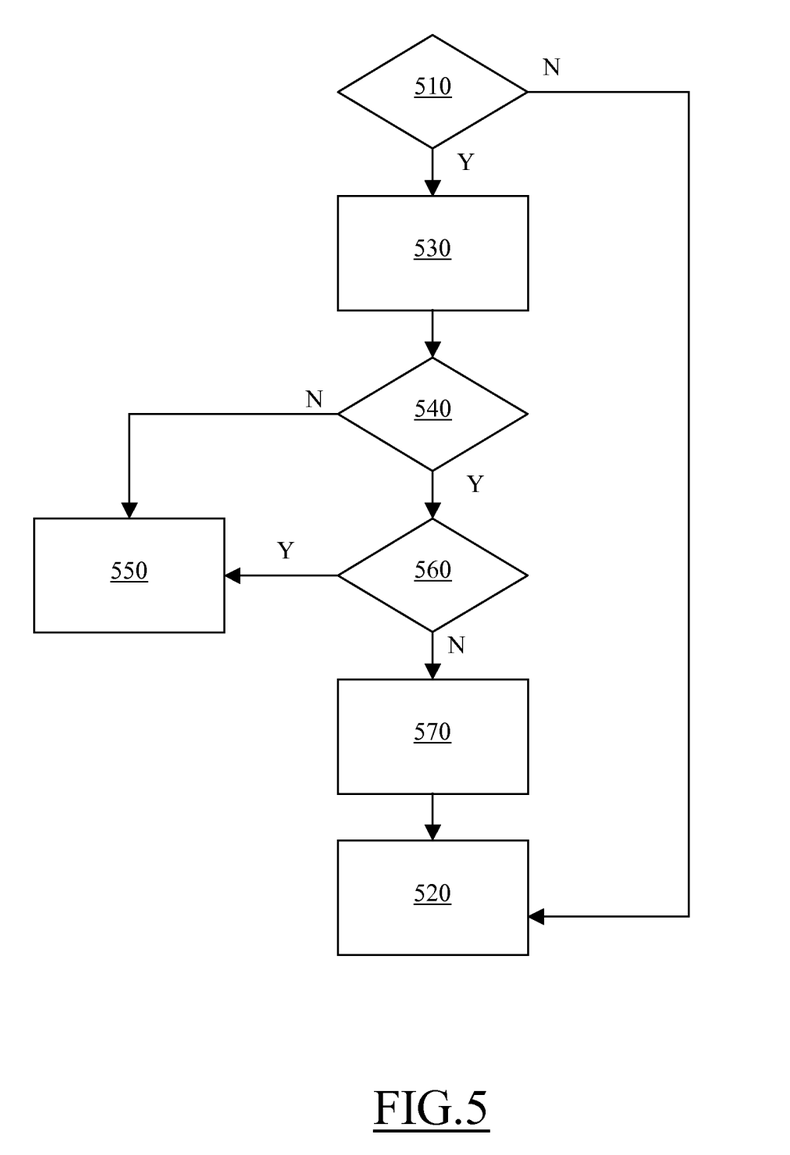
FIG. 5 is a flow chart of a Modulation-and-Coding-Scheme-Adaptive (MCS-adaptive) allocation function according to an embodiment of the present invention.

Making reference to the flow chart illustrated in FIG. 5, the first step of the MCS-adaptive allocation function provides for checking if the set SUE of user terminal(s) UE(q) identified by a considered index pair $\{i, j\}$ has been already allocated or not (block 510).

In the negative case (exit branch N of block 510), the user terminal(s) UE(q) corresponding to the index pair $\{i, j\}$ is/are allocated (block 520) using the best MCS for the given resource block RB(b). Indeed, since said resource block RB(b) is the first block that is allocated, it is possible to use the MCS corresponding to the CQI for this resource block RB(b) without any problem.

In the affirmative case (exit branch Y of block 510), i.e., if user terminal(s) UE(q) corresponding to the index pair $\{i, j\}$ has/have been already allocated on one or more different resource blocks RB(b), the new allocation could require the use of a MCS that differs from the one used before, since the CQI for the new resource block RB(b) could be different from the CQI of the previously allocated resource blocks RB(b). Since the schedule list S is sorted by decreasing score, the MCS on the new resource block RB(b) is smaller than or equal to the MCS of previously allocated resource block RB(b). Given that the use of different MCS schemes on different resource blocks RB(b) of the same codeword is prevented by the standard, a viable, though conservative solution would be to use on all allocated resource blocks RB(b) the MCS corresponding to the RB having the smallest CQI, among the allocated resource blocks RB(b). However, this rule could lead to very poor performance, as it overly favors small-rate MCSs. In general, also other rules could be applied when choosing an unique value of MCS for the allocated resource blocks RB(b) (for example it's possible to use the average MCS among the allocated resource blocks RB(b)).

Therefore, according to an embodiment of the present invention, a check is made to assess whether we may reap a gain by allocating a new resource block RB(b) to the user terminal(s) UE(q) corresponding to the index pair $\{i, j\}$ (possibly) using a smaller MCS on all the resource blocks RB(b) allocated to the user terminal(s) UE(q) corresponding to the index pair $\{i, j\}$. According to an embodiment of the present invention, in order to understand whether the allocation of a new resource block RB(b) to the user terminal(s) UE(q) corresponding to the index pair $\{i, j\}$ is advantageous or not, the throughput gain TG that can be obtained i) performing the new allocation and ii) changing the (one and only) MCS used on all previously allocated resource blocks to the one obtained from the CQI specified for the new resource block, is computed (block 530). According to an embodiment of the present invention throughput gain TG could be defined as:

$$TG=(N_{RBs}(i)+1)*MCS_{new}-Bytes(i)$$

Where:
$N_{RBs}(i)$ is the number of previously allocated RBs to user i
Bytes(i) is the number of previously allocated bytes to user i
$MCS_{new}$ is the number of bytes that can be transmitted with the new MCS If the throughput gain TG is negative or null, the allocation is immediately prevented (exit branch N of block 540, going to block 550).

If instead the gain is positive (exit branch Y of block 540), a check is made for assessing whether a different index pair $\{h, k\}$ exists such that the number of bytes that the user terminal(s) UE(q) corresponding to such index pair $\{h, k\}$ can allocate on the resource block RB(b) is larger than the above computed gain TG (block 560). In this search for better index pairs on the resource block RB(b), only not already allocated pairs are considered, in order to avoid recursion.

In the affirmative case (exit branch Y of block 560), the allocation is immediately prevented (block 550).

In the negative case (exit branch N of block 560), the MCS is adapted on the resource block RB(b) already allocated to the user terminal(s) UE(q) corresponding to the index pair $\{i, j\}$ (block 570), and the resource block RB(b) is actually allocated to the user terminal(s) UE(q) (block 520).

In the following of the present description an exemplary operation of the proposed MCS-adaptive allocation function is described. It is supposed that the system bandwidth is subdivided in three resource blocks RB(b) (b ranging from 0 to 2), and that there are two user terminals UE(q) (q ranging from 1 to 2). Note that the considered case is relative to three resource blocks just for exemplification purposes (a person skilled in the art is aware that in 3GPP standard the smallest number of RBs in LTE is equal to 6 and it is relative to a bandwidth of 1.4 MHz).

It is supposed that the schedule list S created by the TMS algorithm is the following:

|    | RB | Pair | Score |
|----|----|------|-------|
| 1) | 0  | 1, G | 100   |
| 2) | 1  | 2, G | 80    |
| 3) | 2  | 1, G | 60    |
| 4) | 2  | 2, G | 55    |
| 5) | 0  | 2, G | 40    |
| 6) | 1  | 1, G | 30    |

It can be observed that for both users Transmit Diversity has been chosen as transmission mode. It is hypothesized that a cycle is performed on the schedule list S, invoking the MCS-adaptive allocation function for each entry. The following steps are obtained:

1. Entry 1 is visited: RB 0 is free and it is the first allocation for user
2. Entry 2 is visited: RB 1 is free and it is the first allocation for user
3. Entry 3 is visited: RB 2 is free but user 1 has been already allocated on RB 0 so a check is made for assessing whether a new allocation is profitable or not.
   a. First of all compute the throughput gain TG is computed:

$$TG=(1+1)\times 60-100=20$$

b. The gain is positive, so it is necessary to look for better index pairs. The only other pair is {2, G}, but it has been allocated yet, so it is excluded from the search. As a consequence it is concluded that there are no better index pairs and RB 2 is allocated to user 1.

Since all the RBs have been allocated, the procedure ends.

In the following of the present description an exemplary operation of the proposed scheduling process is described. According to this example, the selection sub-procedure is configured to generate the schedule list S using the max local method.

It is supposed that the system bandwidth is subdivided in three resource blocks RB(b) (b=1 to 3), and that there are four user terminals UE(q) (q=1 to 4). It has to be noted that the considered case is relative to three resource blocks just for exemplification purposes (a person skilled in the art is aware that in 3GPP standard the smallest number of RBs in LTE is equal to 6 and it's relative to a bandwidth of 1.4 MHz).

Moreover, all the user terminals UE(q) belong to a same class of service, with a corresponding UQ having the following parameters:
Priority: 3;
Radio delay budget: 50 ms;
Max urgent burst: 500 B, and
Slack time: 10 ms.

It is supposed that the user terminal UE(3) has in its buffer a packet of 100 B that has already waited 41 TTI, while the other user terminals UE(1), UE(2) and UE(4) have data in their respective buffers that are waiting for 15 TTI.

The parameters related to the fairness sub-procedure are the following ones:
T=5, and
t=3.

To keep this example simple all the weights $w_b$ (b=1 to B) are set to 1.

It is supposed that the windows of the historical values of the achievable rates are the following ones:
UE(1): 100, 100, 100, 120, 80;
UE(2): 130, 100, 80, 100, 100;
UE(3): 90, 110, 110, 110, 80;
UE(4): 80, 100, 100, 100, 100.

Moreover, it is supposed that the scaled rate matrix SM (having a dimension equal to B*N*G=3*4*5) is the following (for the sake of readability, SM being three-dimensional, we write it as three two-dimensional matrixes, each one corresponding to a specific resource block RB(b)):

$$SM(b=1) = \begin{pmatrix} 85 & 50 & 45 & 60 & 40 \\ 0 & 120 & 65 & 70 & 30 \\ 0 & 0 & 20 & 75 & 60 \\ 0 & 0 & 0 & 70 & 60 \end{pmatrix}$$

$$SM(b=2) = \begin{pmatrix} 85 & 50 & 75 & 80 & 50 \\ 0 & 80 & 30 & 90 & 30 \\ 0 & 0 & 40 & 60 & 100 \\ 0 & 0 & 0 & 75 & 60 \end{pmatrix}$$

$$SM(b=3) = \begin{pmatrix} 80 & 60 & 65 & 90 & 70 \\ 0 & 80 & 60 & 50 & 60 \\ 0 & 0 & 80 & 30 & 70 \\ 0 & 0 & 0 & 70 & 60 \end{pmatrix}.$$

Based on the abovementioned scaled matrix SM, the selection sub-procedure generates the matrix L whose elements $l_{ij}$ are the highest for a same pair i,j and over all the values of b, within the corresponding elements $sm_{bij}$ of the scaled matrix SM:

$$L = \begin{pmatrix} 85 & 60 & 75 & 90 & 70 \\ 0 & 120 & 65 & 90 & 60 \\ 0 & 0 & 80 & 75 & 100 \\ 0 & 0 & 0 & 75 & 60 \end{pmatrix}.$$

At this point, the iterative search of the maximum value is initiated.

At the first step of the iterative search, the maximum is found to be equal to 120, therefore the index pair {2,2} is chosen, corresponding to user terminal UE(2) scheduled using the SpMux transmission mode. The schedule list S is then updated with the following three tuples T{b, i, j, $sm_{bij}$}:
{1, 2, 2, 120}; {2, 2, 2, 80}; {3, 2, 2, 80}.

Matrix L is then updated by zeroing the row corresponding to i=2 and the column corresponding to j=2, so as to obtain the following matrix L':

$$L' = \begin{pmatrix} 85 & 0 & 75 & 90 & 70 \\ 0 & 0 & 0 & 0 & 0 \\ 0 & 0 & 80 & 75 & 100 \\ 0 & 0 & 0 & 75 & 60 \end{pmatrix}.$$

At the second step of the iterative search, the maximum is found to be equal to 100, therefore the index pair {3,G} is chosen, corresponding to the case of user terminal UE(3) scheduled using the TxD transmission mode. The schedule list S is then updated with the following three tuples T{b, i, j, $sm_{bij}$}:
{1, 3, G, 60}; {2, 3, G, 100}; {3, 3, G, 70}.

The matrix L' is then updated by zeroing the row corresponding to i=3 and the column corresponding to j=3, so as to obtain the following matrix L":

$$L'' = \begin{pmatrix} 85 & 0 & 0 & 90 & 70 \\ 0 & 0 & 0 & 0 & 0 \\ 0 & 0 & 0 & 0 & 0 \\ 0 & 0 & 0 & 75 & 60 \end{pmatrix}.$$

At the third step of the iterative search, the maximum is found to be equal to 90, therefore the index pair {1,4} is chosen, corresponding to the case of user terminals UE(1) and UE(4) transmitted with the MU-MIMO transmission mode. The schedule list S is then updated with the following three tuples T{b, i, j, $sm_{bij}$}:
{1, 1, 4, 60}; {2, 1, 4, 80}; {3, 1, 4, 90}.

Since the transmission mode has been already selected for each one of the four user terminals UE(q), the search is terminated.

The resulting schedule list S, ordered by decreasing score, is the following one:

| RB(b) | Index pair | Score |
|---|---|---|
| RB(1) | {2, 2} | 120 |
| RB(2) | {3, G} | 100 |
| RB(3) | {1, 4} | 90 |

| RB(b) | Index pair | Score |
|---|---|---|
| RB(2) | {2, 2} | 80 |
| RB(3) | {2, 2} | 80 |
| RB(2) | {1, 4} | 80 |
| RB(3) | {3, G} | 70 |
| RB(1) | {3, G} | 60 |
| RB(1) | {1, 4} | 60 |

Based on the abovementioned schedule list S, the QS procedure generates the allocation list A, performing (in this order) the urgency, fairness and efficiency sub-procedures. More in detail, when the QS procedure chooses to perform an allocation for a set SUE of user terminals UE(q), it uses the schedule list S in order know which resource block RB(b) provides the highest achievable rate, among not already allocated resource blocks RB(b). The allocation will be performed on that resource block RB(b) using the MCS-adaptive allocation function.

As an alternative embodiment, it is possible to change the order of execution of the first two sub-procedures of the QS procedure, thus executing the sub-procedures following the order: fairness, urgency, efficiency. To use this variation it is necessary to execute a preliminary step where the amount of resource block(s) RB(b) necessary for the urgency sub-procedure is estimated, in order to reserve such amount of resource block(s) RB(b) for the urgency sub-procedure itself Urgency Sub-Procedure All the user terminals UE(q) belong to the same class of service, for which data are considered to be urgent if they are waiting in the buffer for a time longer than a Delay Threshold (DT) defined as follow:

$$DT = \text{Delay Budget} - \text{Slack Time}$$

Therefore, the only user terminal UE(q) having urgent data is the user terminal UE(3), for which data are waiting for 41 TTI. This user terminal UE(3) is thus served, in a priority manner, on the resource block RB(b) more favorable for said user terminal, making use of the transmission mode selected by the TMS procedure. Therefore, using the MCS-adaptive allocation function, 100 B are allocated to the user terminal UE(3) on the resource block RB(2) using the TD transmission mode.

Since the other user terminals are not considered urgent, the urgency sub-procedure is terminated.

Fairness Sub-Procedure

For each user terminal UE(q) a check is made in order to assess whether its current highest achievable rate (making reference to the schedule list S) is such to consider the user terminal UE(q) itself in a channel peak.

For the user terminal UE(1), the current highest achievable rate is equal to 90 bytes (on the resource block RB(3)); 90 is only higher than a single historical value, therefore the user terminal UE(1) is assessed as not being in a channel peak (the threshold t being equal to 3).

For the user terminal UE(2), the current highest achievable rate is equal to 120 bytes (on the resource block RB(1)); 120 is higher than 4 historical values, i.e., 4 is higher than the threshold t, therefore the user terminal UE(2) is assessed as being in a channel peak. Thus, the user terminal UE(2) is served on the resource block RB(1) (where it has the peak) using the transmission mode selected by the TMS procedure. Therefore, using the MCS-adaptive allocation function, 120 B (bytes) are allocated to the user terminal UE(2) on the resource block RB(1) using the SpMux transmission mode.

For the user terminal UE(3), the current highest achievable rate on a resource block that has not been allocated yet is equal to 70 (on the resource block RB(3)); 70 is lower than all the historical values, therefore the user terminal UE(3) is assessed as not being in a channel peak.

For the user terminal UE(4), the current highest achievable rate is equal to 90 (on the resource block RB(3)); 90 is only higher than a single historical value, therefore the user terminal UE(4) is assessed as not being in a channel peak.

Efficiency Sub-Procedure

The schedule list S is looked up for allocating the resource blocks RB(b) that have been left unallocated so far. Specifically:

the first tuple of the schedule list refers to the resource block RB(1), which has been already allocated to the user terminal UE(2) in the SpMux transmission mode;

the second tuple of the schedule list refers to the resource block RB(2), which has been already allocated to the user terminal UE(3) in the TxD transmission mode, and the third tuple of the schedule list refers to the resource block RB(3), which is still free. Such resource block RB(3) is thus allocated to the user terminals UE(1) and UE(4) in the MU-MIMO transmission mode using the MCS-adaptive allocation function.

Therefore, the allocation list A produced by the QS procedure is the following:

| RB(b) | Index pair | Bytes |
|---|---|---|
| 1 | {2, 2} | 120 |
| 2 | {3, G} | 100 |
| 3 | {1, 4} | 90 |

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof; on the contrary, well known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, although in the present description reference has been made to downlink transmissions of an LTE system, similar considerations apply for the uplink transmissions. In this case, the TMS procedure operates in the same way as already described, allowing to properly select the different transmission mode for the uplink transmission. Regarding the MCS-adaptive allocation function, it is sufficient to substitute the CQI reported by the user terminals with an estimate of the uplink channel carried out by the eNodeB. The QS procedure needs to know the buffers statuses and the waiting time of the HOL packet; this information may be obtained from the BSR sent in uplink by the user terminals.

Moreover, the TMS procedure may be easily extended in such a way to support additional transmission modes. In case said additional transmission modes are of the single-user type, it is sufficient to add a new column in the rate matrix for each additional transmission mode. In case of additional multi-user transmission modes, it has to be appreciated that the resulting rate matrix will have a number of dimensions equal to one plus the highest number of user terminals that can be grouped.

The solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. In a wireless communication network comprising at least one base station associated to a corresponding area for transmitting/receiving data to/from corresponding user terminals located within said area, a method comprising:
    for each base station, generating a user-rate matrix, each element of the user-rate matrix providing a corresponding score, in terms of achievable rate, to a user terminal or to a group of user terminals located within the corresponding area when a transmission is made to/from said user terminal or said group of user terminals, respectively, from/to the base station by employing a selected transmission mode among a set of predetermined transmission modes,
    processing the elements of the user-rate matrix in order to create a scheduling list where the elements are sorted by a decreasing score, and
    associating to each user terminal a corresponding selected transmission mode based on the scheduling list for the transmission/reception of data to/from the base station, wherein:
    said set of predetermined transmission modes includes at least a spatial multiplexing transmission mode, a transmit diversity transmission mode and a multi-user multiple-input multiple-output transmission mode, and
    the bandwidth of each area is partitioned in a corresponding plurality of resource blocks (RB(b)), said generating a user-rate matrix comprises generating a plurality of corresponding sub-matrixes, each sub-matrix corresponding to a specific resource block, wherein each element of a sub-matrix provides a corresponding score to a user terminal or to a group of user terminals located within the corresponding area when a transmission is made to/from said user terminal or said group of user terminals, respectively, from/to the base station by employing a selected transmission mode among the set of predetermined transmission modes using the corresponding resource block, and wherein said group of user terminals comprises a pair of user terminals.

2. The method of claim 1, wherein said generating a plurality of sub-matrixes includes generating each sub-matrix by arranging the elements thereof into a first number of rows corresponding to the number of user terminals within the corresponding area and a second number of columns corresponding to one plus the first number, each row of the sub-matrix corresponding to a respective user terminal and each column of the sub-matrix, with the exception of the last column, corresponding to a respective user terminal, each sub-matrix being such that:
    each element thereof belonging to the main diagonal represents the score of the user terminal corresponding to the row of the element when a transmission is made to/from said user terminal from/to the base station by employing the spatial multiplexing transmission mode using the corresponding resource block;
    each element thereof that do not belong neither to the main diagonal nor to the last column represents the score of the pair of user terminals including the one corresponding to the row of the element and the one corresponding to the column of the element when a transmission is made to/from said pair of user terminals from/to the base station by employing the multi-user multiple-input multiple-output transmission mode using the corresponding resource block, and
    each element thereof belonging to the last column represents the score of the user terminal corresponding to the row of the element when a transmission is made to/from said user terminal from/to the base station by employing the transmission diversity transmission mode using the corresponding resource block.

3. The method of claim 2, wherein said processing the elements of the user-rate matrix in order to create the scheduling list comprises:
    generating a further matrix based on the user-rate matrix, said further matrix having a number of rows equal to the first number and a number of columns equal to the second number, each row of the further matrix being associated with a corresponding row of each sub-matrix, and each column of the further matrix being associated with a corresponding column of each sub-matrix, each element of the further matrix belonging to a row and a column of the further matrix depending on the values of the elements of the sub-matrixes belonging to the corresponding rows and the corresponding columns of the sub-matrixes associated with said row and column of the further matrix, and
    repeating the following steps:
        finding the highest element of such further matrix;
        inserting in the scheduling list the elements of the sub-matrixes located in the rows and columns associated with the row and column of the highest element of the further matrix, said inserting being performed according to a score decreasing order, and
        zeroing the elements of the further matrix belonging to the row and column of the highest element and, if the highest element is located in a row of the further matrix identified by a first row matrix index and in a column of the further matrix identified by a first column matrix index with the first row matrix index that is different from the first column matrix index and the first column matrix index that is different from the second number, zeroing also the elements of the further matrix belonging to the row identified by a second row matrix index equal to the first column matrix index and to the column identified by a second column matrix index equal to the first row matrix index,
    until each one of the user terminals located within the area has an element of each sub-matrix located in a row or column corresponding thereto that is listed in the scheduling list.

4. The method of claim 3, wherein said generating the further matrix based on the user-rate matrix comprises setting each element of the further matrix belonging to a row and a column of the further matrix to a value depending on the sum of a group of values, each value of the group corresponding to the quotient of the division between;
    an element of a respective sub-matrix belonging to the corresponding row and the corresponding column of such sub-matrix which are associated with said row and column of the further matrix, and
a power of two.

5. The method of claim 3, wherein said generating the further matrix based on the user-rate matrix comprises setting each element of the further matrix belonging to a row and a column of the further matrix to a value depending on a set of the highest elements of the sub-matrixes belonging to the corresponding rows and the corresponding columns of the sub-matrixes associated with said row and column of the further matrix.

6. The method according to claim 2, wherein said processing the elements of the user-rate matrix in order to create the scheduling list comprises:
repeating the following steps:
finding the highest element of the user-rate matrix, said highest element belonging to a particular row and a particular column of a particular sub-matrix of the plurality;
inserting in the scheduling list the elements of the sub-matrixes of the plurality which are located in the row and column corresponding to the user terminal or the user terminals corresponding to said particular row and said particular column, said inserting being performed according to a score decreasing order, and
in each sub-matrix, zeroing the elements belonging to the row and column corresponding to the user terminal or the user terminals corresponding to said particular row and said particular column and, if the particular row is identified by a first row matrix index and the particular column is identified by a first column matrix index with the first row matrix index that is different from the first column matrix index and the first column matrix index that is different from the second number, zeroing also the elements belonging to the row corresponding to the user terminal corresponding to the row of the particular sub-matrix identified by a second row matrix index equal to the first column matrix index and to the column corresponding to the user terminal corresponding to the column of the particular sub-matrix identified by a second column matrix index equal to the first row matrix index,
until each one of the user terminals located within the area has an element of each sub-matrix located in a row or column corresponding thereto that is listed in the scheduling list.

7. The method of claim 1, wherein said associating to each user terminal a corresponding selected transmission mode based on the scheduling list includes associating the same selected transmission mode onto all the resource blocks wherein said user terminal is allocated.

8. The method of claim 1, further including:
for each sub-matrix, scaling the value of each element with a weight indicative of the amount of inter-cell interference on the resource block corresponding to such sub-matrix.

9. The method of claim 1, further including:
based on the scheduling list, generating an allocation list providing, for each user terminal, or pair of user terminals, a corresponding group of resource blocks to be assigned thereto, and
based on the allocation list, assigning each resource block to a specific user terminal, or to a pair of user terminals, for the transmission/reception of data to/from the base station taking into account quality of service requirements.

10. The method of claim 9, wherein said generating the allocation list includes:
having a group of classes of services, defining for each class of service of the group a corresponding urgent queue of user terminals having urgent data,
for each user terminal in an urgent queue, updating the corresponding group of resource blocks to be assigned thereto with new free resource blocks until at least one of the following conditions is fulfilled:
the urgent data of such user terminal, or pair of user terminals, are finished;
a predetermined maximum amount of allocable data is reached, and
there are no more free resource blocks.

11. The method of claim 10, wherein said generating the allocation list further includes:
for each user terminal, updating the corresponding group of resource blocks to be assigned thereto with a new free resource block wherein such user terminal, or pair of user terminals, has a local peak in its channel quality.

12. The method of claim 11, wherein said generating the allocation list further includes:
for each user terminal, or pair of user terminals, updating the corresponding group of resource blocks to be assigned thereto with a new free resource block according to a MaxCi-like behavior.

13. The method of claim 10, wherein said assigning each resource block to a specific user terminal, or to a pair of user terminals, for the transmission/reception of data to/from the base station further includes adaptively selecting a modulation and coding scheme to be used onto a resource block in such a way that all the resource blocks belonging to a same codeword use the same modulation and coding scheme, by verifying whether it is profitable for the cell throughput to allocate a new resource block to a user terminal, or pair of user terminals, that has already been allocated at least one resource block.

14. A wireless communication network comprising at least one base station associated to a corresponding area for transmitting/receiving data to/from corresponding user terminals located within said area, wherein the at least one base station includes a scheduler configured to carry out the method of claim 1.

15. A base station in a wireless communication network associated to a corresponding area for transmitting/receiving data to/from corresponding user terminals located within said area, the base station configured to:
generate a user-rate matrix, each element of the user-rate matrix providing a corresponding score, in terms of achievable rate, to a user terminal or to a group of user terminals located within the corresponding area when a transmission is made to/from said user terminal or said group of user terminals, respectively, from/to the base station by employing a selected transmission mode among a set of predetermined transmission modes,
process the elements of the user-rate matrix in order to create a scheduling list where the elements are sorted by a decreasing score, and
associate to each user terminal a corresponding selected transmission mode based on the scheduling list for the transmission/reception of data to/from the base station, wherein:
said set of predetermined transmission modes includes at least a spatial multiplexing transmission mode, a transmit diversity transmission mode and a multi-user multiple-input multiple-output transmission mode, and the bandwidth of each area is partitioned in a corresponding plurality of resource blocks (RB(b)), said generating a user-rate matrix comprises generating a plurality of corresponding sub-matrixes, each sub-matrix corresponding to a specific resource block, wherein each element of a sub-matrix provides a corresponding score to a user terminal or to a group of user terminals located within the corresponding area when a transmission is made to/from said user terminal or said group of user terminals, respectively, from/to the base station by employing a selected transmission mode among the set of predetermined transmission modes using the corresponding resource block, and wherein said group of user terminals comprises a pair of user terminals.

16. A non-transitory computer-readable medium including computer program instructions, which when executed by a base station in a wireless communication network associated to a corresponding area for transmitting/receiving data to/from corresponding user terminals located within said area, cause the base station to:

generate a user-rate matrix, each element of the user-rate matrix providing a corresponding score, in terms of achievable rate, to a user terminal or to a group of user terminals located within the corresponding area when a transmission is made to/from said user terminal or said group of user terminals, respectively, from/to the base station by employing a selected transmission mode among a set of predetermined transmission modes, process the elements of the user-rate matrix in order to create a scheduling list where the elements are sorted by a decreasing score, and associate to each user terminal a corresponding selected transmission mode based on the scheduling list for the transmission/reception of data to/from the base station, wherein:

said set of predetermined transmission modes includes at least a spatial multiplexing transmission mode, a transmit diversity transmission mode and a multi-user multiple-input multiple-output transmission mode, and the bandwidth of each area is partitioned in a corresponding plurality of resource blocks (RB(b)), said generating a user-rate matrix comprises generating a plurality of corresponding sub-matrixes, each sub-matrix corresponding to a specific resource block, wherein each element of a sub-matrix provides a corresponding score to a user terminal or to a group of user terminals located within the corresponding area when a transmission is made to/from said user terminal or said group of user terminals, respectively, from/to the base station by employing a selected transmission mode among the set of predetermined transmission modes using the corresponding resource block, and wherein said group of user terminals comprises a pair of user terminals.

* * * * *